Figure 1:
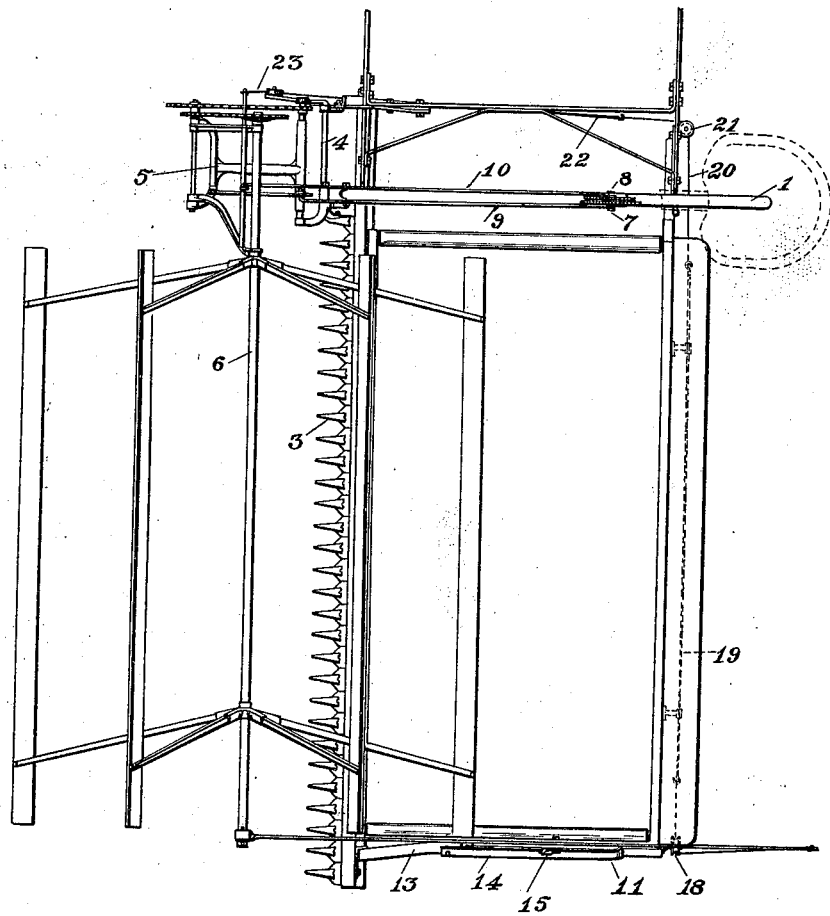

H. J. PODLEŠÁK.
HARVESTER REEL SUPPORT.
APPLICATION FILED APR. 27, 1911.

1,000,552.

Patented Aug. 15, 1911.
2 SHEETS—SHEET 1.

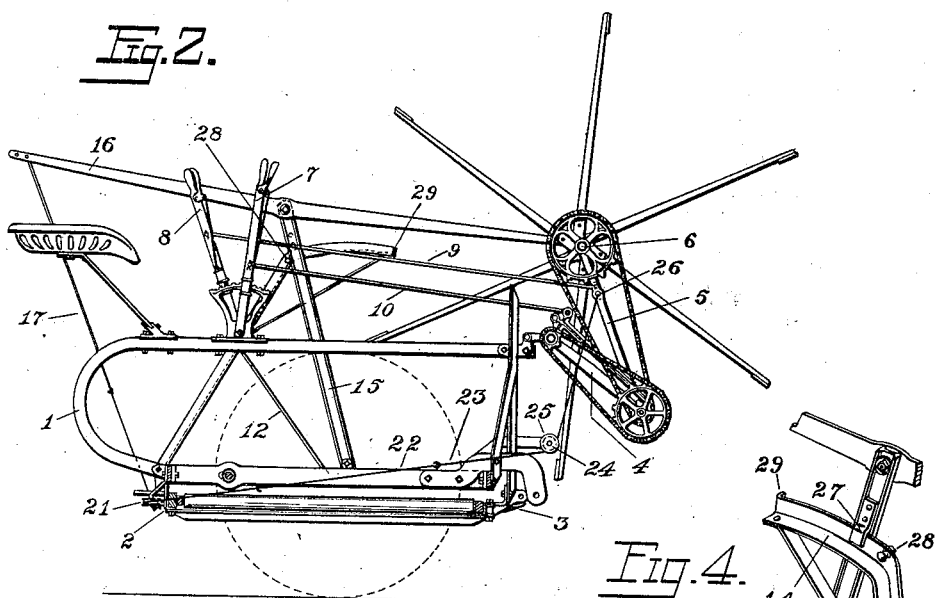
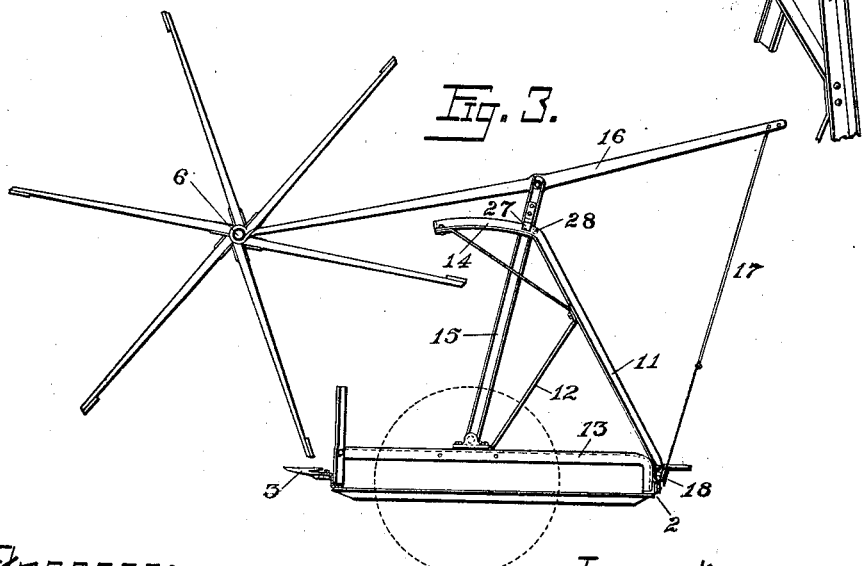

UNITED STATES PATENT OFFICE.

HENRY J. PODLEŠÁK, OF MOLINE, ILLINOIS, ASSIGNOR TO DEERE & COMPANY, OF MOLINE, ILLINOIS, A CORPORATION OF ILLINOIS.

HARVESTER-REEL SUPPORT.

1,000,552.

Specification of Letters Patent. Patented Aug. 15, 1911.

Application filed April 27, 1911. Serial No. 623,691.

*To all whom it may concern:*

Be it known that I, HENRY J. PODLEŠÁK, citizen of the United States, residing at Moline, in the county of Rock Island and State of Illinois, have invented certain new and useful Improvements in Harvester-Reel Supports, of which the following is a specification, reference being had therein to the accompanying drawing.

My invention relates to harvester-reels, and more particularly to that type of reel adapted to wide cut machines, its object being to construct the reel and connecting parts in such a manner as to preserve the parallelism of the reel with the platform and cutting mechanism of a harvester.

In the accompanying drawings Figure 1 is a plan view of a harvester-reel with its supporting and operating mechanism, together with the cutting apparatus and platform of a harvester and part of the frame. Fig. 2 is a view in elevation of Fig. 1 from the stubbleward side. Fig. 3 is a detail showing the grainward end of the harvester-platform and the supporting mechanism for the outer end of the reel, and Fig. 4 is a detail.

Referring to the drawings, 1 represents a seat supporting-pipe secured both to front and rear of the harvester-frame.

2 indicates the platform, and 3 the cutter-bar.

The reel mechanism is of a well known type and consists of a lower arm 4 horizontally journaled on the pipe 1 and the harvester-frame; the upper end of the arm 4 is bifurcated and registers with the lower end of the upper arm 5, and is pivotally connected therewith. The upper end of the arm 5 forms a dual bearing for the reel-shaft 6. The arms 4 and 5 are movable in a fore and aft as well as an upward or downward direction by means of levers 7 and 8 pivoted to a double sector mounted on the pipe 1; links 9 and 10 connect the levers 7 and 8 with the arms 4 and 5 respectively; both levers 7 and 8 are furnished with the usual latches and detents to engage with the teeth on the sector. The reel is revolved by the ordinary sprocket and chain connection with the source of power.

On the grainward end of the harvester platform 2 and at its rear end is secured a standard 11, strengthened by a brace 12 connecting the standard with a bar 13 forming part of the end of the harvester-platform 2. The standard 11 inclines forwardly, and has at its upper end a forwardly extending curved part 14, which may be of separate structure and fastened to the standard 11, or integral therewith as shown. Pivotally mounted on the bar 13 is a rocking standard 15, on the upper end of which is pivoted a lever 16, having a bearing on its forward end for the grainward end of the reel-shaft 6. The rearward end of the lever 16 is connected with a cable 17, which passes under a sheave 18 mounted on the outer rear corner of the harvester-platform 2, and is connected to a rod 19, shown in dotted lines in Fig. 1, which extends partly the length of the platform frame, and connects with a short cable 20 leading over a sheave 21, mounted on a rear lower bar of the harvester-frame, and attached to the rear-end of a rod 22 which extends forwardly and connects with a cable 23. The cable 23 leads under a sheave 24, mounted on a bracket 25 on the front of the harvester-frame, thence upward to a projection 26 on the upper-arm 5 of the reel operating mechanism.

The rocking standard 15 is the radius of a circle of which the forwardly extending curved portion 14 of the standard 11 is an arc, and is held in close relation with the latter by a clip 27 which is secured to the rocking-standard and laps the curved portion 14 as shown in Figs. 3 and 4. A stop 28, to fix the limit of the rearward movement of the rocking-standard 15, is fastened on the standard 11, and a stop 29, preferably integral with the curved portion 14 of the standard 11 limits the forward movement of the rocking-standard 15, the distance between stops 28 and 29 being sufficient to permit play of the rocking-standard 15 for any position to which it may be desired to adjust the reel. By operating the lever 7 to raise the arm 4, the arm 5 is elevated, carrying with it the reel, and by means of the cable connected to the arm 5 and the rear end of the lever 16, the rear end of the latter is drawn downward and the forward end, supporting the grainward end of the reel-shaft is elevated, so that both ends of the reel are raised simultaneously; a forward movement of the lever 7 will yield the cable to an upward movement of the rear-end of the lever 16, allowing the forward-end to move downward corresponding with the movement of the arm 5.

When a forward or rearward movement of the reel is desired, the lever 8 is operated to swing the arm 5, and by reason of the reel-shaft 6 being supported by the arm 5 and the pivoted standard 15 their movement is simultaneous; the clip 27 engaging with the curved portion 14 of the standard 11, operates against any strain lateral to the movement of the standard 15.

What I claim is—

1. In a reel-supporting mechanism for harvesters, the combination with a harvester having a platform, of a reel-shaft journaled at its stubbleward end in an adjustable support, means for adjusting said support to vary the position of the reel relative to the harvester-platform, a rocking standard pivoted on the harvester-platform, a lever pivotally connected to said standard and extending rearwardly thereof, the grainward end of the reel-shaft journaled on the forward end of the lever, and means connecting the movable reel-support at the stubbleward end of the platform and the rear end of the lever to cause both ends of the reel to be moved in unison and in parallel relation to the harvester-platform.

2. In a reel-supporting mechanism for harvesters, the combination with a harvester having a platform, of a reel-shaft journaled at its stubbleward end in an adjustable support, means for adjusting said support to vary the position of the reel relative to the harvester-platform, a rocking standard pivoted on the harvester-platform, a lever pivotally connected to said standard and extending rearwardly thereof, the grainward end of the reel-shaft journaled on the forward end of the lever, means for adjusting said lever in unison with the adjustment of the stubbleward reel-support to maintain the relative parallelism of the reel and the platform, and a standard rigidly secured to the harvester-platform and having a forwardly extending part forming a guide, and means on the rocking standard to engage therewith.

3. In a reel-supporting mechanism for harvesters, the combination with a harvester having a platform, of a reel-shaft journaled at its stubbleward end in an adjustable support, means for adjusting said support to vary the position of the reel relative to the harvester-platform, a rocking standard pivoted on the harvester-platform, a lever pivotally connected to said standard and extending rearwardly thereof, the grainward end of the reel-shaft journaled on the forward end of the lever, means for adjusting said lever in unison with the adjustment of the stubbleward reel-support to maintain the relative parallelism of the reel and the platform, an upwardly and forwardly inclined standard rigidly secured to the harvester-platform and having a forwardly extending part forming a guide, and a clip on the rocking standard to engage therewith.

4. In a reel-supporting mechanism for harvesters, the combination with a harvester having a platform, of a reel-shaft journaled at its stubbleward end in an adjustable support, means for adjusting said support to vary the position of the reel relative to the harvester-platform, a rocking standard pivoted on the harvester-platform, a lever pivotally connected to said standard and extending rearwardly thereof, the grainward end of the reel-shaft journaled on the forward end of the lever, means for adjusting said lever in unison with the adjustment of the stubbleward reel-support to maintain the relative parallelism of the reel and the platform, a standard rigidly secured to the harvester-platform, and having a curved forwardly extending part forming a guide, and a clip on the rocking standard to engage with the guide.

5. In a reel-supporting mechanism for harvesters, the combination with a harvester having a platform, of a reel-shaft journaled at its stubbleward end in an adjustable support, means for adjusting said support to vary the position of the reel relative to the harvester-platform, a rocking standard pivoted on the harvester-platform, a lever pivotally connected to said standard and extending rearwardly thereof, the grainward end of the reel-shaft journaled on the forward end of the lever, means for adjusting said lever in unison with the adjustment of the stubbleward reel-support to maintain the relative parallelism of the reel and platform, and a standard rigidly secured to the harvester-platform and having a curved forwardly extending part forming an arc to which the rocking standard is a radius, and a clip on the standard to engage with the forwardly extending part.

In testimony whereof I affix my signature, in presence of two witnesses.

HENRY J. PODLEŠÁK.

Witnesses:
HARLAND E. RICH,
ANNA A. CONWELL.

---

Copies of this patent may be obtained for five cents each, by addressing the "Commissioner of Patents, Washington, D. C."